United States Patent [19]

Furukawa et al.

[11] Patent Number: 4,592,561
[45] Date of Patent: * Jun. 3, 1986

[54] STEERING SYSTEM FOR VEHICLES

[75] Inventors: Yoshimi Furukawa, Saitama; Shoichi Sano, Tokyo, both of Japan

[73] Assignee: Honda Giken Kogyo Kabushiki Kaisha, Tokyo, Japan

[*] Notice: The portion of the term of this patent subsequent to Aug. 28, 2001 has been disclaimed.

[21] Appl. No.: 575,444

[22] Filed: Jan. 31, 1984

[30] Foreign Application Priority Data

Jan. 31, 1983 [JP] Japan .................. 58-14420
Jan. 31, 1983 [JP] Japan .................. 58-14421
Jan. 31, 1983 [JP] Japan .................. 58-14422
Jan. 31, 1983 [JP] Japan .................. 58-14425

[51] Int. Cl.$^4$ ............................................. B62D 5/10
[52] U.S. Cl. ........................................ 280/91; 74/28
[58] Field of Search ............... 180/140; 280/98, 99, 280/103, 91, 96; 74/28, 30

[56] References Cited

U.S. PATENT DOCUMENTS 2,371,022  3/1945  Blagden ............................ 280/91
4,467,885  8/1984  Furukawa et al. ............... 280/91

FOREIGN PATENT DOCUMENTS 359985  3/1962  Switzerland ...................... 280/96

Primary Examiner—John J. Love
Assistant Examiner—Ross Weaver
Attorney, Agent, or Firm—Irving M. Weiner; Joseph P. Carrier; John J. Cantarella

[57] ABSTRACT

A steering system for vehicles comprising a steering wheel, a front steering sub-system including a drive pinion interlocked to be rotatable with the steering wheel, a rack shaft having a first rack engaged with the drive pinion and a second rack separated from the first rack, and a driven pinion engaged with the second rack; and a rear steering sub-system including an input shaft operatively connected to the driven pinion, an off-centered pin provided at one end of the input shaft, a pair of rear tie-rods adapted each respectively to turn either of the rear wheels, and a joint member relatively rotatably connected to the off-centered pin and both of the rear tie-rods. The joint member has a longitudinal axis thereof extending transversely of the vehicle. The axis of the off-centered pin is located substantially on the longitudinal axis. The rear tie-rods are connected to the joint member substantially on the longitudinal axis substantially at the same level as the axis of the off-centered pin.

The steering system may further comprise an engagement adjustment mechanism for adjusting the engagement between at least either of the pinions and one of the racks associated therewith, the adjustment mechanism being constituted with a gear box having accommodated therein the drive pinion, the rack shaft, and the driven pinion, an off-centered ring being interposed between the inner circumference of the gear box and the outer circumference of the rack shaft, and a rotating mechanism for rotating the off-centered ring.

6 Claims, 8 Drawing Figures

STEERING SYSTEM FOR VEHICLES

BACKGROUND OF THE INVENTION

1. Field of the Invention

The present invention relates to a steering system for vehicles. More particularly, the invention relates to an improvement in a steering system for a vehicle with front and rear wheels, which steering system permits both the front wheels and the rear wheels to be steered.

2. Description of Relevant Art

There have been proposed by the present applicant a variety of steering systems for a vehicle with front and rear wheels, which steering systems permit the front and rear wheels to be concurrently steered, while varying the steered angle ratio therebetween in accordance with the steering angle of a steering wheel.

In U.S. patent application Ser. No. 407,421 filed Aug. 12, 1982, there is described an example of such steering systems consisting of a steering wheel, a front steering sub-system for steering the front wheels in accordance with the steering angle of the steering wheel, and a rear steering sub-system for steering the rear wheels in accordance with the steering angle of the steering wheel. The front steering sub-system includes a steering gearing of a rack and pinion type composed of a drive pinion interlocked to be rotatable with the steering wheel, a rack shaft having a first rack engaged with the drive pinion and a second rack separated from the first rack, and a driven pinion engaged with the second rack. The rear steering sub-system includes an input shaft interlinked with the driven pinion, an off-centered pin secured to one end of the input shaft, a pair of rear tie-rods adapted eacg respectively to turn either of the rear wheels, and a joint member relatively pivotably connected to the off-centered pin and both of the rear tie-rods, the joint member being arranged to be movable vertically and transversely of the vehicle in accordance with the crank motion of the off-centered pin, thereby rendering the steered angle ratio between the front and rear wheels variable according to the steering angle of the steering wheel.

According to such exemplary steering system, the rear wheels are permitted to be steered in the same direction as the front wheels for relatively small steering angles of the steering wheel and in the opposite direction thereto for relatively large steering angles of the steering wheel, thus providing the vehicle with favorable maneuverability characteristics when travelling at relatively high speeds, as well as favorable vehicle turning characteristics due to relatively small turning radii possible with large steering angles such as when executing a U-turn or when steering in and out of a parking space.

However, in the exemplified steering system, the joint member has a vertically extending portion loose-fitted at the upper part thereof on the off-centered pin and connected at the lower part thereof to each of the rear tie-rods and is disposed under a floor panel of a body of the vehicle, thus being necessarily restricted in the space for arrangement in the vertical direction, which leads to a desideratum for a favorable joint member designed to have relatively small vertical dimensions and sufficiently designed for the pivotal connection with the rear tie-rods in addition to being arranged thereabout to be as compact as possible.

Moreover, in the steering system in question, the drive and driven pinions, which are accommodated in a steering gear box, are engaged with the first and second racks, respectively, forming respective predetermined angles therebetween which are different from each other, necessarily due to the structure of the vehicle, when axially viewed from either end of the rack shaft, so that the adjustment for respective engagement relations of these two rack and pinion mechanisms is considerably difficult and must be made independently of the bearing adjustment of the rack shaft adjustment service of the steering gear box is thus rendered extremely troublesome, which leads to another desideratum i.e., for a favorable steering gearing with simplified fabrication and maintenance.

The present invention has been achieved to improve a steering system for vehicles, which is already proposed by the applicant, by fulfilling the aforesaid desiderata.

SUMMARY OF THE INVENTION

A principal object of the present invention is to provide a steering system for vehicles including a joint member interconnecting a pair of rear tie-rods with an off-centered pin provided at one end of an input shaft of a rear steering sub-system, in which the joint member is permitted to have vertical dimensions which are as small as possible, while achieving a favorably compact arrangement therearound.

Another object of the present invention is to provide a steering system for vehicles including drive and driven pinions each respectively engaged with a pair of racks formed on a rack shaft in a steering gear box, in which the adjustment for holding at least either of the pinions in proper engagement with one of the racks associated therewith is permitted to be concurrently performed with the bearing adjustment of the rack shaft, thus successfully facilitating the adjustment work concerning the steering gear box.

According to the present invention, there is provided a steering system for a vehicle with front and rear wheels, comprising a steering wheel, a front steering sub-system for steering the front wheels in accordance with the steering angle of the steering wheel, the front steering sub-system including a drive pinion interlocked to be rotatable with the steering wheel, a rack shaft having a first rack engaged with the drive pinion and a second rack separated from the first rack, and a driven pinion engaged with the second rack, and a rear steering sub-system for steering the rear wheels in accordance with the steering angle of the steering wheel, the rear steering sub-system including an input shaft operatively connected to the driven pinion, an off-centered pin provided at one end of the input shaft, a pair of rear tie-rods adapted each respectively to turn either of the rear wheels, and a joint member relatively rotatably connected to the off-centered pin and both of the rear tie-rods, the joint member having a longitudinal axis thereof extending transversely of the vehicle, the axis of the off-centered pin located substantially on the longitudinal axis, and the rear tie-rods connected thereto substantially on the longitudinal line substantially at the same level as the axis of the off-centered pin.

The above-disclosed steering system may further comprise an engagement adjustment mechanism for adjusting the engagement between at least either of the pinions and one of the racks associated therewith, the adjustment mechanism being constituted of a gear box having accommodated therein the drive pinion, the rack shaft, and the driven pinion, an off-centered ring interposed between the inner circumference of the gear box and the outer circumference of the rack shaft, and a rotating mechanism for rotating the off-centered ring.

The above and further features, objects and advantages of the present invention will become more fully apparent from the following detailed description of the preferred embodiment of the invention when the same is read in conjunction with the accompanying drawings.

DETAILED DESCRIPTION OF THE PREFERRED EMBODIMENT

Figure 1:
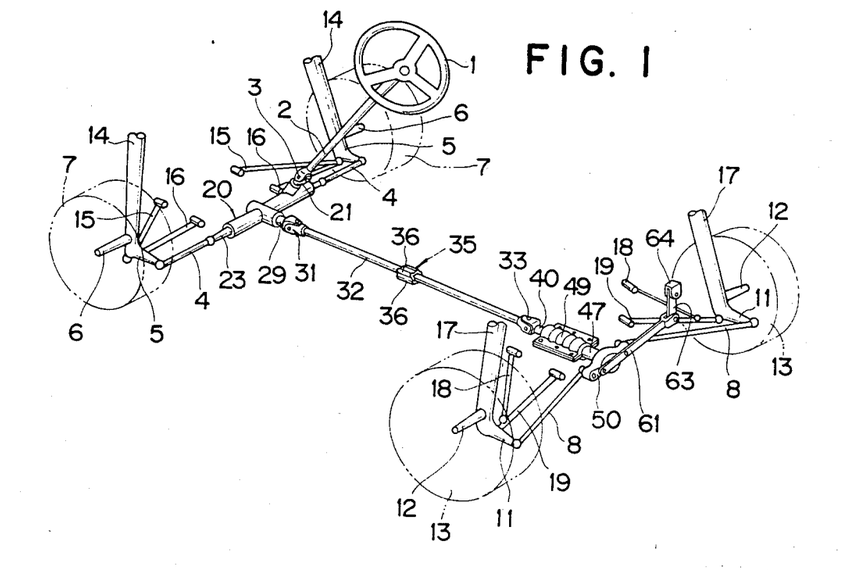
FIG. 1 is a schematic perspective view of a steering system for vehicles according to the present invention.

Referring first to FIG. 1, designated at reference numeral 1 is a steering wheel of a steering system according to the present invention, the steering system being equipped in a four-wheeled vehicle. The steering wheel 1 is provided with a steering column 2 connected at the lower end thereof through a universal joint 3 to a drive pinion shaft 21, which has a lower part thereof assembled into a steering gear box 20 of a rack and pinion type and formed integral with a drive pinion (not shown). The steering gear box 20, lying across the longitudinal centerline of the vehicle, has disposed at the right of this centerline the drive pinion shaft 21 and at the left thereof a driven pinion shaft 29 formed integral with a driven pinion 28 of FIG. 8.

Figure 8:
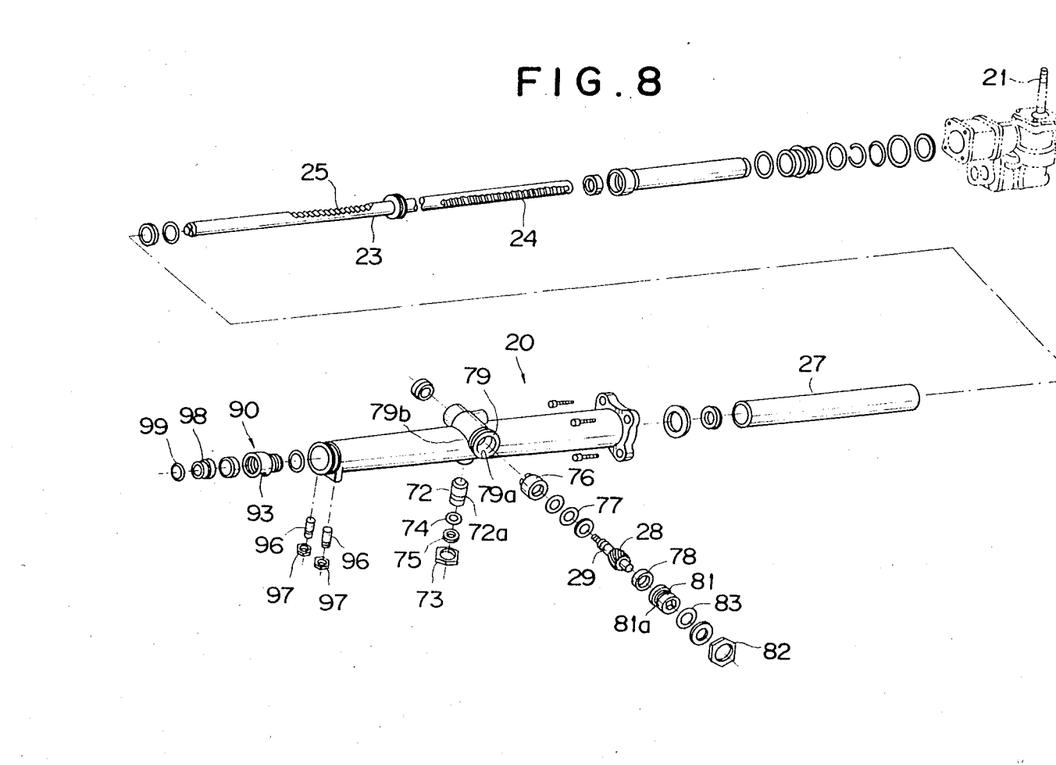
FIG. 8 is an exploded perspective view of an essential inner part of the steering gear box of FIG. 4.

As shown in FIG. 8, in the gear box 20, there is longitudinally arranged a cylinder barrel 27 having a rack shaft 23 provided therethrough as a piston rod slidable in the axial direction thereof, the rack shaft 23 constituting together with the cylinder barrel 27 a power cylinder of a well known type. The rack shaft 23 has in the right-half part thereof a rack 24 formed thereon, facing in the forward direction of the vehicle, and engaged with the drive pinion, and in the left-half part thereof another rack 25 formed thereon leftwardly of the power cylinder, while facing in the upward direction of the vehicle, and engaged with the driven pinion 28.

Figure 4:
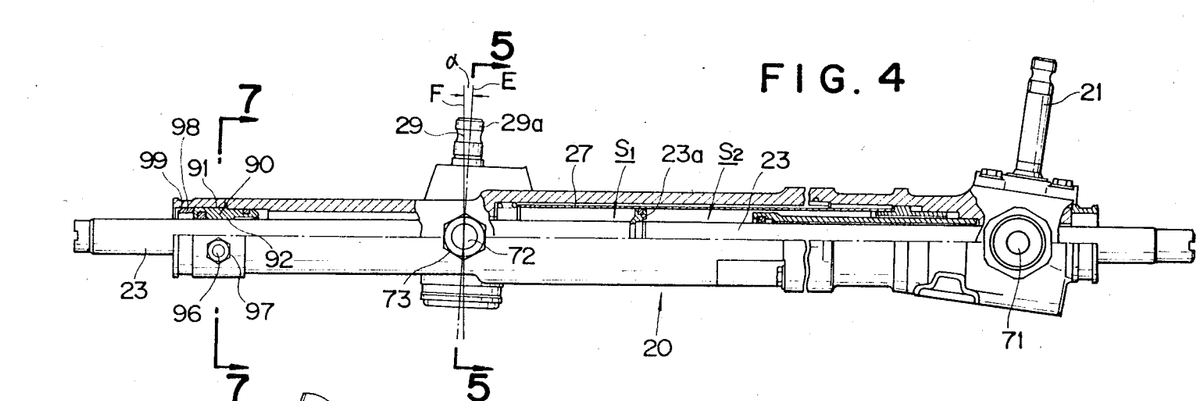
FIG. 4 is a partially cut-away bottom view of a steering gear box of the steering system of FIG. 1, with a drive pinion shaft and various screws and bolts arranged substantially on the bottom side of the steering gear box all simply shown to illustrate horizontal positional relations thereamong irrespective of the angle.
Figure 5:
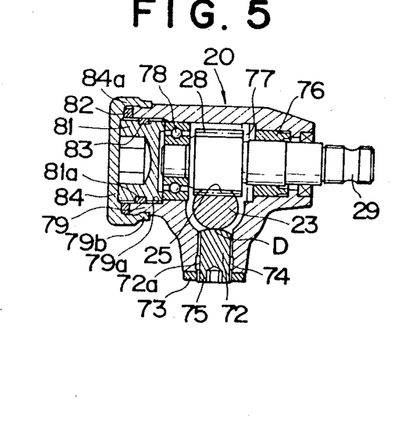
FIG. 5 is a sectional view taken along line 5—5 of FIG. 4.
Figure 6:
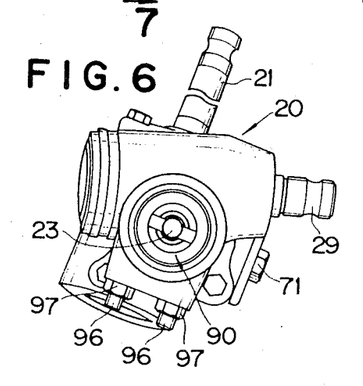
FIG. 6 is a left side view of the steering gear box of FIG. 4.

As shown in FIGS. 1 and 4, the drive pinion shaft 21 is inclined at the upper part thereof in the rearward direction of the vehicle, somewhat slanting rightwardly, while the driven pinion shaft 29, which is substantially horizontally arranged in the longitudinal direction of the vehicle, has the axis E thereof slanting, when viewed from the bottom, somewhat rightwardly, thus forming a certain angle $a$ with a straight line F extending in parallel with the longitudinal centerline of the vehicle. Accordingly, the drive pinion and the driven pinion 28, as well as the racks 24, 25 engaged therewith, have helical teeth formed thereon, respectively.

The rack shaft 23 is projected at either end thereof from both sides of the gear box 20 and connected to respective inner ends of a pair of front tie-rods 4, 4 each respectively connected at the outer end thereof to one of a pair of front knuckle arms 5, 5 which have their axle shafts 6, 6 projecting outwardly and respectively supporting a pair of front wheels 7, 7.

Consequently, the steering wheel 1 is connected through a front steering sub-system as described hereinabove to the front wheels 7, 7, which are thus steerable in accordance with the steering angle of the steering wheel 1, whereas the rack 25, the driven pinion 28, and the driven pinion shaft 29 may be assumed constitute a part of a below-described rear steering sub-system. As well known, the steering of the front wheels 7, 7 is favorably effected by the transverse movement of the rack shaft 23, while being assisted by the power cylinder which reduces the steering torque of the steering wheel 1.

The driven pinion shaft 29 has a rear portion thereof 29a projecting rearwardly from the gear box 20, the rear portion 29a being inclined by the slanting angle $a$ toward the longitudinal centerline of the vehicle and connected at the rear end thereof through a universal joint 31 to a linkage shaft 32, while the axis E of the driven pinion shaft 29 is aligned with the axis of the link shaft 32. In this respect, the shafts 29, 32 may be integrated into a single shaft, thus eliminating the interconnection therebetween.

The linkage shaft 32 has in a longitudinally central part thereof a rubber damper 35 fitted such as by baking or bonding on the outer circumference thereof. The rubber damper 35 comprises a plurality of radially outward projections 36 extending by a certain length in the axial direction of the linkage shaft 32. When the linkage shaft 32, which is relatively flexible, is about to be flexed at the longitudinally central part toward a floor panel (not shown) of a body (not shown) of the vehicle, the projection 36 become correspondingly deformed to be compressed between the linkage shaft 32 and the floor panel, with the result that the elasticity of the rubber damper 35 favorably prevents the linkage shaft 32 from contacting directly with the floor panel.

In this respect, the rubber damper 35 may have a length sufficient to cover substantially the entire length of the linkage shaft 32. Also, the configuration of the projections 35 is not limited to the above-described embodiment, and there may alternatively be employed a rubber damper comprising a plurality of continuous ring-like projections. Moreover, there may be employed a plurality of rubber dampers located, not only in the longitudinally central part of the linkage shaft 32, but also in front and behind thereof.

Figure 2:
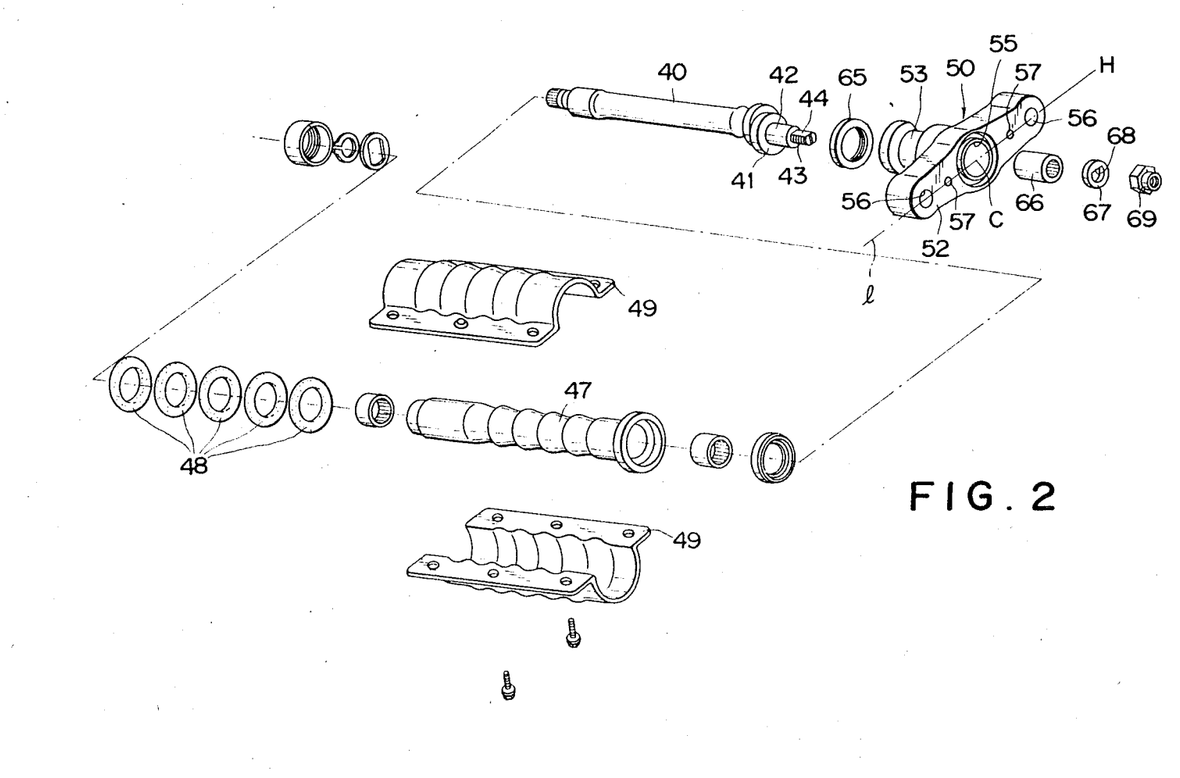
FIG. 2 is an exploded perspective view of an essential part including a joint member and an input shaft of a rear steering sub-system of the steering system of FIG. 1.

The linkage shaft 32 is connected at the rear end thereof through a universal joint 33 to the front end of an input shaft 40 of a rear steering sub-system which is adapted to cause a pair of rear wheels 13, 13 to be steered in accordance with the steering angle of the steering wheel 1. The input shaft 40 is arranged coincident with the longitudinal centerline of the vehicle and, as shown in FIG. 2, provided in the form of a rotatable member supported by an assembly comprising an inner holder 47, a plurality (e.g., five in FIG. 2) rubber rings 48 fitted on the outer circumference of the inner holder 47, and an outer holder assembled to be fitted from outside of the rubber rings 48 on the inner holder 47 and secured such as to the floor panel of the vehicle body. The input shaft 40 has an off-centered flange 41 formed at the rear end thereof.

The off-central flange 41 is provided in the central part of the rear face thereof with an off-centered pin 42 projecting rearwardly therefrom, the off-centered pin 42 thus being off-centered with respect to the axis of the input shaft 40. The off-centered pin 42 is loose-fitted in the central part of a joint member 50, so as to support the joint member 50 in a relatively rotatable manner.

The joint member 50 is formed relatively short in the vertical direction of the vehicle and relatively long in the transverse direction thereof, and provided in the left and right end parts of a front face 51 thereof with either a pair of ball joints 9, 9 cooperating for interconnectingly holding respective inner ends of a pair of rear tie-rods 8, 8. In the vertically central part of a rear face 52 of the joint member 50, at two points located at the left and right, respectively, of the center of the rear face 52, is fastened the distal part of an arm member 61 by means of a pair of bolts 62, 62. The arm member 61 has the proximal part thereof extending rightwardly in FIG. 1, thus maintaining a substantially horizontal position thereof, and pivotally supported at the proximal end thereof with a link 63 suspended by means of a bracket 64 from the floor panel of the vehicle body, thereby restricting the pivotal movement of the joint member 50, which is thus held in a horizontal position.

The rear tie-rods 8, 8 interconnectedly supported by the joint member 50 are each respectively connected to the outer end thereof to one of a pair of rear knuckle arms 11, 11 which have their axle shafts 12, 12 projecting outwardly and respectively supporting the rear wheels 13, 13.

In FIG. 1, designated at reference numeral 14, 14 are a pair of front damper units, 15, 15 are a pair of front radius rods, and 16, 16 are a pair of front lower arms, each constituting part of a front supension of the vehicle, while 17, 17 are a pair of rear damper units, 18, 18 are a pair of rear radius rods; and 19, 19 are a pair of rear lower arms, each constituting part of a rear suspension thereof.

In the above-described arrangement, when the steering wheel 1 is operated to be steered, the rack shaft 23 in the steering gear box 20 will move transversely of the vehicle, outputting to the driven pinion 28, which is engaged with the rack 25 formed in the left-half part of the rack shaft 23, an angular displacement necessary for causing the rear steering sub-system to properly function, which angular displacement will be transmitted through the linkage shaft 32 to, the input shaft 40 (to thereby rotate same) of the rear steering sub-system.

As the input shaft 40 rotates, the off-centered pin 42, which is integrally provided at the rear end of the input shaft 40 and has an initial position thereof preset to be perpendicular, i.e.; upwardly perpendicular in this embodiment, to the axis of the input shaft 40, will move in a crank manner, thereby causing, through the joint member 50, the rear tie-rods 8, 8, and the rear knuckle arms 11, 11, the rear wheels 13, 13 to be properly turned in accordance with the steering angle of the steering wheel 1.

Namely, the rear wheels 13, 13 are to be steered in the same direction as the front wheels 8, 8 for relatively small steering angles of the steerig wheel 1 corresponding to those angular displacements of the off-centered pin 42 ranging from the initial position to one-half revolution, and in the opposite direction thereto for relatively large steering angles of the steering wheel 1 corresponding to those exceeding one-half revolution.

Figure 3:
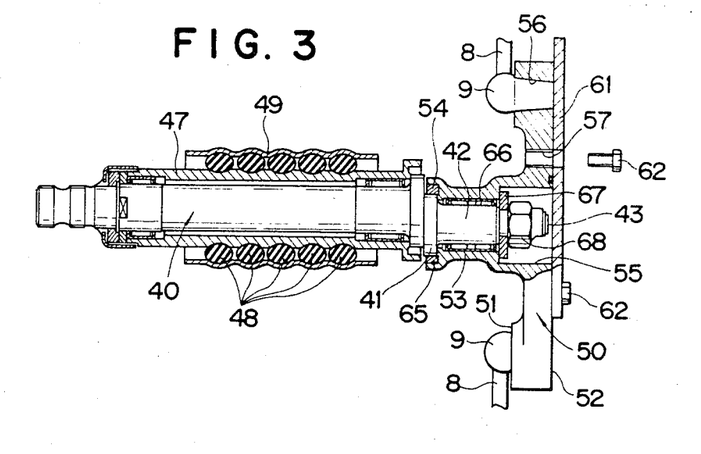
FIG. 3 is a longitudinal sectional plan view of the essential part, as assembled, of FIG. 2.

Referring now to FIGS. 2 and 3, there will be described in detail hereinbelow the structure of the joint member 50, as well as the operative cooperation thereof with the off-centered pin 42, the arm member 61, and the rear tie-rods 8, 8.

As shown in FIG. 2, the joint member 50 is relatively short in the vertical direction and long in the transverse direction of the vehicle, while having a certain thickness in the longitudinal direction of the vehicle, and arranged symmetrical about the vertical centerplane thereof. The joint member 50 has on the front face 51 thereof a tubular portion projection forwardly therefrom and a hollow 55 formed therethrough, with a relatively large diameter, from the rear end of the tubular portion 53 to the rear face 52, the hollow 55 being coaxial with the tubular portion 53.

As shown in FIG. 3, the joint member 50 has in the left and right ends parts thereof either of a pair of tapered fixing holes 56, 56 formed therethrough from the front face 51 to the rear face 52 for respectively fitting therein the ball joints 9, 9, and in the rear face 52, at the left and right of the hollow 55, either of a pair of female thread portions 57, 57.

The hollow 55 and the fixing holes 56, 56 as well as the female thread portions 57, 57, have their axes normal to and substantially lying on a longitudinal axis l of the joint member 50, as shown in FIG. 2.

On the other hand, the off-centered pin 42 projectingly integrated with the rear end of the input shaft 40, which shaft 40 is supported rotatably by the inner holder 47 and elastically by the combination of the rubber rings 48 and the outer holder 49 with respect to the vehicle body, has in the rear part thereof a male thread portion 43 provided, as shown in FIG. 2, with a flat face 44 formed thereon in the axial direction of the off-centered pin 42.

When assembling the joint member 50 to the off-centered pin 42, a seal ring 65 is first interposed between the outer circumference of the off-centered flange 41 as the proximal part of the off-centered pin 42 and the inner circumference of an enlarged part 54 of the tubular portion 53 of the joint member 50, then a needle bearing 66 is inserted between the outer circumference of the off-centered pin 42 and the inner circumference of tubular portion 53, before driving the male thread portion 43 as the distal part of the off-centered pin 42 into the hollow 55 formed behind the tubular portion 53.

Thereafter, a washer 67, the inner circumference of which is formed with a flat surface 68 as shown in FIG. 2, is fitted on the male thread portion 43 of the off-centered pin 42, and a lock nut 69 is screwed thereto. At this stage, the lock nut 69 is sunk in the hollow 55 of the joint member 50, which is now relatively rotatably loose-fitted on and supported at the central part thereof by the off-centered pin 42.

Then, the ball joints 9, 9 are to have their fixing portions fitted from the front into the fixing holes 56, 56 of the joint member 50, respectively, and their joint portions connected to respective inner ends of the rear tie-rods 8, 8.

As the next step, the distal part of the arm member 61 is put in position on the rear face 52 of the joint member 50 so as to close the hollow 55, and the bolts 62, 62 are screwed respectively in the female thread portions 57, 57, thereby fastening the arm member 61 to the joint member 50. The arm member 61 is now supported at the proximal part thereof by the link 63, while extending substantially transversely of the vehicle, with the distal part thereof disposed in a transversely central bottom space of the vehicle and bolted to the joint member 50 at two points spaced transversely of the vehicle, thus holding the longitudinal axis 1 of the joint member 50 substantially horizontal, so that the arm member 61 and the rear tie-rods 8, 8 are pivotally connected to be supported by the joint member 50 substantially at the same level as the axis C of the off-centered pin 42.

As will be understood from the foregoing, besides being relative small in height, the joint member 50 is connected to the rear tie-rods 8, 8 and the arm member 61, in a separately arranged manner, i.e., at the front face 51 to the former and at the rear face 52 to the latter, while respective connecting points of the arm member 61 and the rear tie-rods 8, 8 are arranged substantially at the same level H as the axis C of the off-centered pin 42, so that the joint assembly, including the joint member 50 and associated parts, is made favorably compact, which is remarkably advantageous in respect of the layout.

With respect to the arrangement of the rear tie-rods 8, 8 and the arm member 61, which are connected to the front face 51 and the rear face 52 of the joint member 50 in this embodiment, there may be employed an arrangement in which they are all connected to the rear face 52 of the joint member 50.

Referring now to FIGS. 4 to 8, there will be described in detail hereinbelow the inner structure of the steering gear box 20.

As shown in FIG. 4, the rack shaft 23, which is provided through the cylinder barrel 27 arranged longitudinally in the steering gear box 20, has at the central part thereof a piston 23a fixedly fitted on the outer circumference thereof, thereby defining a left hydraulic chamber S1 and a right hydraulic chamber S2 in the cylinder barrel 27. The above-mentioned power assist is effected by selectively supplying hydraulic oil through a changeover valve to the left and right hydraulic chambers S1, S2 in a well-known manner.

The rack shaft 23 further has at the back of the right rack 24, which is engaged with the drive pinion, a pushing element (not shown) in contact therewith. The pushing element is normally urged by the resilient force of a spring (not shown) to resiliently bias the rack shaft 23 toward the drive pinion. The resilient force of the spring is adjustable by driving to advance or retreat an adjust bolt 71 screwed in the rear part of the gear box 20, while such an adjusting arrangement for adjusting the engagement between a pinion and a rack is well known. In other words, the adjustment of the engagement between the drive pinion and the right rack 24 is effected in a well known manner.

As shown in FIGS. 5 to 8, the gear box 20 has in the lower part thereof at the back of the left rack 25, which is engaged with the driven pinion 28, a stopper screw 72 screwed to be inserted therein, with a spacing D set approximately 0.5 mm relative to the rack shaft 23, which spacing D is initially set by fixing the stopper screw 72 with a lock nut 73. The stopper screw 72 has around the outer circumference thereof a ring slot 72a formed therein and provided with an O-ring 74 and a cap ring 75 fitted thereon, thereby effecting the sealing.

Between the gear box 20 and the upper outer circumference of the driven pinion shaft 29, there are interposed a mechanical seal 37 and a needle thrust bearing 77, while between the gear box 20 and the lower circumference thereof is interposed a ball bearing 78. Moreover, the gear box 20 has at the front side thereof a through hole 79a formed coaxially with the driven pinion shaft 29, the hole 79a being provided with a cap screw 81 screwed therein. The cap screw 81 is brought in abutment with a ball bearing 78 by tightening a lock nut 82, and has around the outer circumference thereof a ring slot 81a formed therein and provided with an O-ring 83 fitted therein. The hole 79a is formed through a tubular projection 79 of the gear box 20 and provided with a cap-like cover 84 fitted thereon, the cover 84 having an outer peripheral piece 84a clamped on a small-diameter portion 79b of the projection 79.

Figure 7:
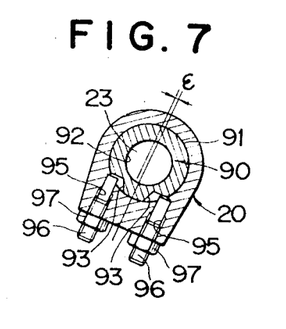
FIG. 7 is a sectional view taken along line 7—7 of FIG. 4.

As shown in FIGS. 7 and 8, between the inner circumference of the left end of the gear box 20 and the outer circumference of the rack shaft 23, there is interposed an off-centered ring 90 which has an outer circumference 91 thereof slidably fitted in the inner circumference of the gear box 20, and an inner circumference 92 thereof slidably fitted on the outer circumference of the rack shaft 23, the outer and inner circumferences 91, 92 being off-centered relative to each other by a deviation $\epsilon$ of approximately 1 mm.

The off-set ring 90 has on the outer circumference 91 a pair of recesses 93, 93 formed therein, the recesses 93, 93 being arranged as shown in FIG. 7 so as to be adjacent each other and to extend in the same direction.

The gear box 20 is further provided in the lower part at the left end thereof with a pair of holes 95, 95 vertically arranged and spaced from each other in the longitudinal direction of the vehicle, the holes 95, 95 having a pair of adjust screws 96, 96 screwed respectively thereto and each extended respectively to reach at the distal end thereof in one of the recesses 93, 93 formed in the outer circumference of the off-centered ring 90. With a pair of lock nuts 97, 97, the adjust screws 96, 96 are respectively adapted to each abut on the bottom of one of the recesses 93, 93.

The positioning in the insertion of the off-centered ring 90 into the gear box 20 is effected with the diameter difference provided in the longitudinal direction between the outer circumference of the off-centered ring 90 and the inner circumference of the gear box 20. The off-centered ring 90 is provided with a retainer 98 abutting on the outer end thereof. The removal of the off-centered ring 90 is prevented by fitting a snap ring 99 between the outer circumference of the retainer 98 and the inner circumference of the gear box 20.

When adjusting the engagement relation between the left rack 25 and the driven pinion 28 engaged therewith, one of the adjust screws 96, 96 is advanced and the other retreated, thereby causing the off-centered ring 90 to gradually rotate in the gear box 20, to have the left part of the rack shaft 23, which is supported by the inner circumference 92 of the off-centered ring 90, gradually move toward the driven pinion 28 in accordance with the off-centering deviation (from 0 to 1 mm) of the off-centered ring 90, till the left rack 25 becomes firmly engaged with the driven pinion 28. Then, after stopping the advance and retreat of the adjust screws 96, 96, the lock nuts 97, 97 are tightened, thereby holding the driven pinion 28 firmly engaged with the rack 25. During the steering, the flexing of the rack shaft 23 is restricted by the stopper screw 72 which is disposed at the back of the rack 25 while spaced downwardly by the distance D from the the rack shaft 23.

As will be understood from the foregoing, in this embodiment, the driven pinion 28 is held firmly engaged with the left rack 25, not by use of a conventional resilient member, but by means of an off-centered ring adapted for the bearing of the left end of the rack shaft 23, thus permitting the bearing adjustment of the rack shaft 23 to be performed concurrently with the engagement adjustment, thereby successfully facilitating the adjustment service.

In this respect, in the above-described embodiment, there may be employed another off-centered ring for holding the drive pinion properly engaged with the right rack 24.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. A steering system for a vehicle with front and rear wheels, comprising:
    a steering wheel;
    a front steering sub-system for steering said front wheels in accordance with the steering angle of said steering wheel;
    said front steering sub-system including a drive pinion interlocked to be rotatable with said steering wheel, a rack shaft having a first rack engaged with said drive pinion and a second rack separated from said first rack, and a driven pinion engaged with said second rack;
    a rear steering sub-system for steering said rear wheels in accordance with the steering angle of said steering wheel;
    said rear steering sub-system including an input shaft operatively connected to said driven pinion, an off-centered pin provided at one end of said input shaft, a pair of rear tie-rods adapted to respectively turn either of said rear wheels, and a joint member relatively rotatably connected to said off-centered pin and both of said rear tie-rods; and
    said joint member having a longitudinal axis thereof extending transversely of said vehicle, the axis of said off-centered pin being located substantially on said longitudinal axis, and said rear tie-rods connected thereto substantially on said longitudinal axis substantially at the same level as said axis of said off-centered pin.

2. A steering system according to claim 1, further comprising:
    restriction means for restricting the pivotal movement of said joint member; and
    said restriction means having a link plate suspended from the body of said vehicle, and an arm member connected at one end thereof to said joint member and at the other end thereof to said link plate, so as to extend substantially horizontally.

3. A steering system according to claim 1, further comprising:
    an engagement adjustment mechanism for adjusting the engagement between at least either of said pinions and one of said racks associated therewith; and
    said adjustment mechanism being constituted with a gear box having accommodated therein said drive pinion, said rack shaft, and said driven pinion, an off-centered ring interposed between the inner circumference of said gear box and the outer circumference of said rack shaft, and rotating means for rotating said off-centered ring.

4. A steering system according to claim 3, wherein:
    said rotating means comprises a pair of recesses formed in the outer circumference of said off-centered ring, a pair of holes formed in the peripheral wall of said gear box, and a pair of adjust screws each respectively screwed in one of said holes and abutting on the bottom of one of said recesses formed in said off-centered ring.

5. A steering system according to claim 1, wherein:
    said driven pinion is disposed at either side with respect to the longitudinal certerline of said vehicle, and has a shaft formed integral therewith;
    said input shaft is disposed on said longitudinal centerline of said vehicle;
    said shaft of said driven pinion is connected through a relatively long linkage shaft to said input shaft; and
    said shaft of said driven pinion has a rear portion thereof inclined toward said longitudinal centerline of said vehicle, such that said shaft of said driven pinion and said linkage shaft lie substantially on a single straight line.

6. A steering system according to claim 1, wherein:
    said driven pinion has a shaft formed integral therewith;
    said shaft of said driven pinion and said input shaft are interconnected through a relatively long linkage shaft; and
    said linkage shaft has on the outer circumference of at least a part thereof a rubber damper fitted thereon.

* * * * *

UNITED STATES PATENT AND TRADEMARK OFFICE
CERTIFICATE OF CORRECTION

PATENT NO. : 4,592,561
DATED : June 3, 1986
INVENTOR(S) : Yoshimi FURUKAWA, et al It is certified that error appears in the above-identified patent and that said Letters Patent are hereby corrected as shown below:

Column 1, line 34, change "eacg" to --each--.

Column 4, line 20, before "constitute" insert --to--.

Column 5, line 2, after "2)" insert --of--;
line 9, change "off-central" to --off-centered--;

Column 6, line 20, change "projection" to --projecting--;
line 26, change "ends" to --end--;
line 34, change "1" to --$\ell$--.

Column 7, line 12, change "1" to --$\ell$--;

Signed and Sealed this

Second Day of December, 1986

Attest:

DONALD J. QUIGG

Attesting Officer         Commissioner of Patents and Trademarks

UNITED STATES PATENT AND TRADEMARK OFFICE
CERTIFICATE OF CORRECTION

PATENT NO. : 4,592,561
DATED : June 3, 1986
INVENTOR(S) : Yoshimi FURUKAWA, et al It is certified that error appears in the above-identified patent and that said Letters Patent are hereby corrected as shown below:

Column 5, line 44, change "supension" to --suspension--.

Column 6, line 18, change "centerplane" to --center plane--.

Column 7, line 18, change "relative" to --relatively--.

Column 8, line 12, change "in" to --into--.

Signed and Sealed this

Twenty-seventh Day of January, 1987

Attest:

DONALD J. QUIGG

*Attesting Officer*   *Commissioner of Patents and Trademarks*